United States Patent

[11] 3,624,380

| [72] | Inventor | Noel Davis<br>Chagrin Falls, Ohio |
|---|---|---|
| [21] | Appl. No. | 30,662 |
| [22] | Filed | Apr. 22, 1970 |
| [45] | Patented | Nov. 30, 1971 |
| [73] | Assignee | Integrated Development & Manufacturing Company<br>Chagrin Falls, Ohio |

[54] LIGHTING ARRANGEMENT
5 Claims, 3 Drawing Figs.

[52] U.S. Cl. ................................................ 240/2,
62/118, 98/40, 128/346, 165/108, 240/47, 313/22
[51] Int. Cl. ................................................ F21v 33/00
[50] Field of Search ........................................ 240/2, 9 A,
11.4, 11.2, 47, 51.11; 62/118, 176, 203; 98/40;
128/346; 165/27, 48, 54; 313/22, 24

[56] References Cited
UNITED STATES PATENTS

| 1,435,192 | 11/1922 | Anderson | 240/47 |
|---|---|---|---|
| 1,973,132 | 9/1934 | Wheat | 240/47 X |
| 1,993,724 | 3/1935 | Gebhard | 313/32 |
| 2,105,430 | 1/1938 | Metcalf | 313/22 |
| 2,295,031 | 9/1942 | Davis | 240/47 X |
| 3,237,005 | 2/1966 | Norton | 240/47 X |
| 3,393,728 | 7/1968 | Davis | 165/108 |
| 3,416,328 | 12/1968 | Davis et al. | 62/118 |

*Primary Examiner*—Louis J. Capozi
*Attorney*—Fay, Sharpe & Mulholland

ABSTRACT: A lighting arrangement and lamp assembly particularly suitable for producing illumination with a minimum of the infrared range of wavelengths and especially suited for use in environmental growth chambers. The lamp assembly disclosed includes a tungsten-iodide lamp positioned in a first housing member formed from a material which is transparent to light of a substantial range of wavelengths including infrared. A second housing member formed from a light-transmissive material is positioned about the first housing member in spaced relationship thereto. Means are provided to seal between the first and second housing members to provide a closed chamber through which illumination produced by the lamp must pass in order to escape from the assembly. Fan means function to pass cooling air through the first housing member and about the lamp positioned therein; and, means are provided for circulating water through the sealed chamber between the first and second housing members so that all the light passing from the assembly is filtered through the circulating water.

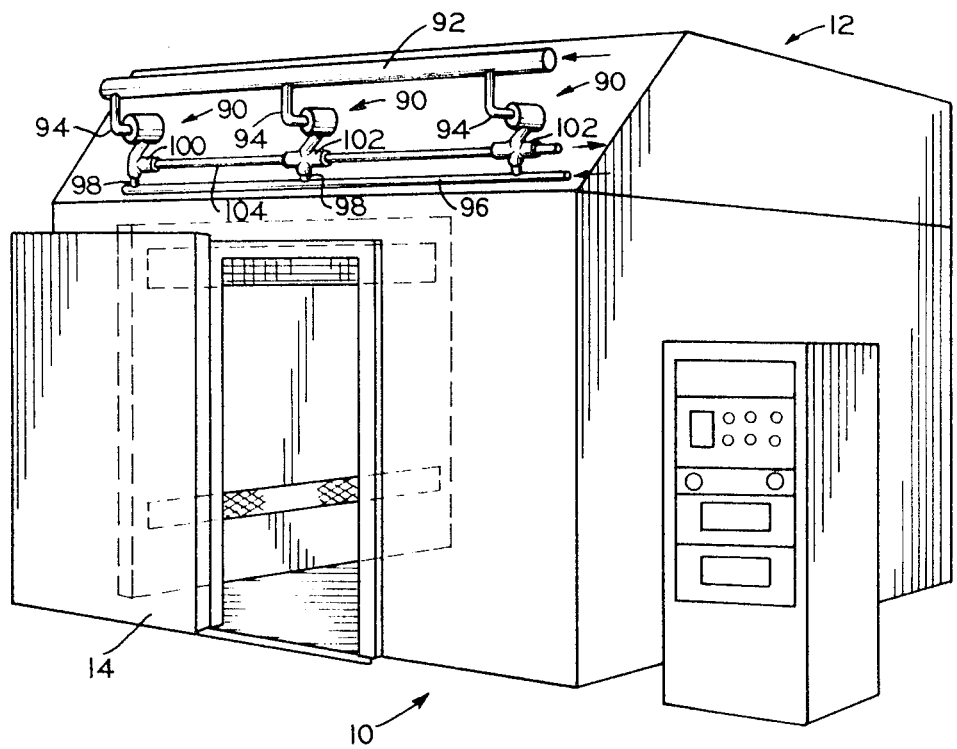

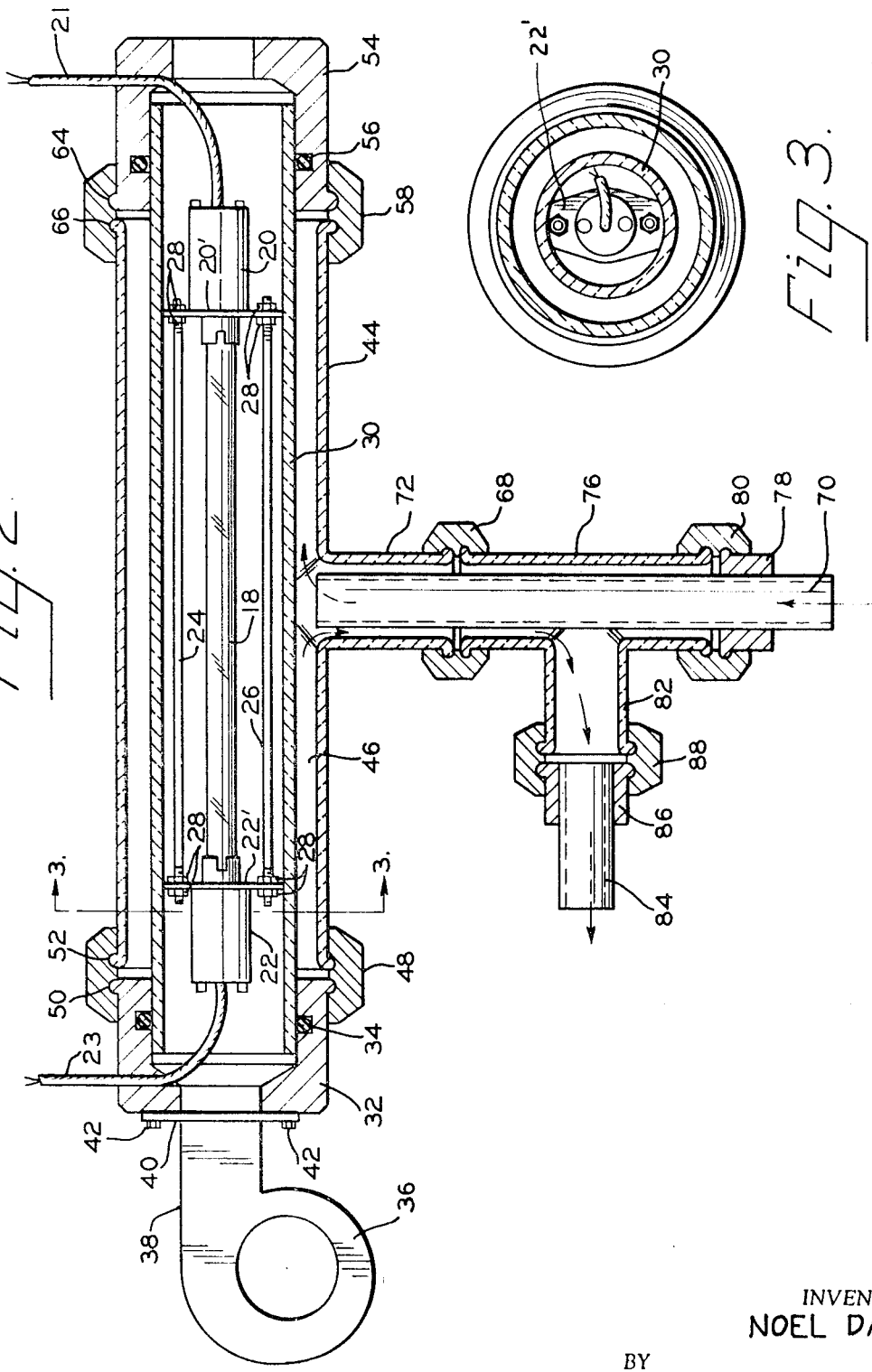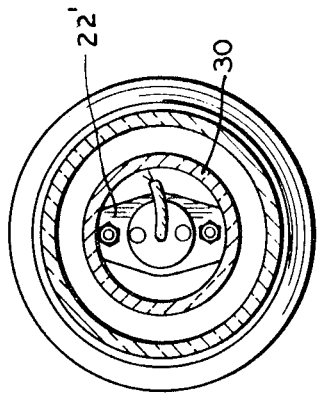

LIGHTING ARRANGEMENT

The subject invention is directed toward the lighting art and, more particularly, to an improved lamp assembly having a light with a light output which has only a small percentage of infrared.

The invention is especially suited for use in providing artificial illumination for growing plants in environmental growth chambers and the like and will be described with particular reference thereto; however, it will be appreciated that devices formed in accordance with the invention could be used in many other environments.

Environmental growth chambers are widely used for conducting experiments on living organisms and, for example, are often used for conducting experiments on plant growth rate, photosynthesis, etc. As a general rule, it is necessary that the chambers be capable of producing and maintaining closely controlled conditions of temperature, humidity, and illumination for extended periods of time.

Generally, when the chambers are used for plant growth experiments, it is desirable that the illumination level within the chambers be as high as possible. This has been accomplished by various combinations of fluorescent and incandescent lamps, as well as other types of commercially available lamps.

Many of the lamps used are capable of producing extremely high levels of illumination with a major portion of their light output in the wavelength range of from approximately 400 to 800 millimicrons. It is this range which is particularly conducive to plant growth.

In addition to the desirable range of wavelengths (so far as plants are concerned), the typical lamp arrangements produce a substantial amount of infrared radiation and generate a large amount of heat. The presence of infrared can cause increases in the temperature of plant leaf surfaces by as much as 20° F. above the ambient atmosphere. This leaf temperature rise has deleterious effects on plant growth and tends to cause wilting. Further, the large amount of heat generated by the lamps makes it difficult to hold the desired air temperatures within the growth chambers. In efforts to overcome these problems, complicated temperature control equipment and special lamp chamber arrangements have been provided.

The present invention overcomes the above-discussed problems and provides a lamp assembly wherein the heat generated by the lamps is rapidly and efficiently removed. Additionally, and more importantly, the light output from the assembly has substantially no light in the infrared range. Further, the invention can be applied to existing growth chambers with a minimum of modification or, alternately, built into new chambers without increasing their first cost.

In accordance with one aspect of the invention, there is provided a lamp assembly which includes a first, elongated tubular housing member formed from a temperature-resistant light-transmissive material. Positioned within the first housing member is at least one electric lamp of a type which produces illumination having a substantial range of wavelengths including those in the infrared portion of the spectrum. A second elongated tubular housing member is positioned about the first and spaced therefrom to define a closed chamber. Means are provided for circulating air through the first member to conduct away heat generated by the lamp. Also, there are means for permitting circulation of water through the closed chamber. The water, in addition to conducting away additional heat, serves to filter light of infrared wavelength to prevent it from being emitted from the assembly.

A more specific aspect of the invention contemplates that the first and second housing members comprise concentric, cylindrical glass tubes with the space between the tubes sealed at its opposite ends, and the inner tube arranged so that air can be conducted longitudinally therethrough and over the lamps.

Another aspect of the invention contemplates an environmental growth chamber including an insulated test chamber including control means for maintaining closely controlled conditions of temperature and humidity within the chamber. Associated with the chamber are a plurality of electric lamps for maintaining a desired illumination level within the chamber including means for maintaining a flow of cooling air over the lamps and means for circulating water between the lamps and the chamber in a manner to assure that all light passing from the lamps into the chamber is filtered through the water.

Accordingly, a primary object of the invention is the provision of a simple and inexpensive lamp assembly which has a high-level light output with substantially none of the light output in the infrared portion of the spectrum.

Another object is the provision of a lamp assembly of the general type described which has a combined air and water cooling arrangement.

Still another object of the invention is the provision of a lamp assembly which is particularly suited for use in environmental growth chambers because of its absence of infrared output and its effective cooling arrangement.

Yet a further object is the provision of an improved environmental growth chamber with an improved lamp arrangement for preventing infrared radiation and lamp-generated heat from entering the test chamber.

These and other objects and advantages will become apparent from the following description when read in conjunction with the accompanying drawings wherein:

FIG. 1 is a pictorial elevation, somewhat diagrammatic, illustrating a typical growth chamber structure of the type in which the invention is particularly suited for use;

FIG. 2 is a longitudinal cross section through a lamp assembly embodying certain aspects of the invention and of the type used in the growth chamber of FIG. 1; and, FIG. 3 is a cross-sectional view taken on lines 3—3 of FIG. 2.

Referring now to the drawings wherein the showings are for the purpose of illustrating preferred embodiments of the invention only, and not for the purpose of limiting same, FIG. 1 shows the overall arrangement of a typical environmental growth chamber including a test chamber portion 10 and a superposed light cap or lamp chamber assembly 12. Test chamber 10 is a well-insulated room or chamber provided with heavily insulated wall and access opening such as the door 14. Positioned within the chamber are means, such as a rack and the like, for supporting various test specimens. The chamber is also provided with temperature and humidity controlling apparatus which can maintain the temperature and humidity levels to extremely close tolerances. The particular type of humidity control apparatus utilized in the subject chamber is not of importance to the invention. It could, however, be as shown in the commonly assigned U.S. Pat. No. 3,416,328, issued Dec. 17, 1968.

The lamp chamber assembly is preferably removably positioned over the open upper end of the test chamber and arranged to support a multiplicity of closely spaced electric lamps which function to maintain a high and predetermined level of illumination within the test chamber. Normally the lamp chamber is separated from the test chamber by a horizontal, air barrier member such as Plexiglas. The barrier member normally extends across upper end of chamber to provide an air seal between the lamp chamber and the test chamber. Generally, although not shown in the subject embodiment, the lamp chamber is provided with means to maintain a continuous flow of cooling air therethrough to prevent a heat build up within the lamp chamber which would tend to affect the temperature control within the test chamber 10.

As discussed earlier, if the test chamber is used for running tests on plants, it is desirable to have a very high level of illumination, but the major portion of illumination should preferably be in the range of wavelengths between approximately 400 and 800 millimicrons. It is this range of wavelengths to which plants respond most favorably. It is extremely undesirable to have any substantial amount of illumination of infrared wavelengths because of the increase in plant leaf temperature produced by infrared radiation.

Many types of electric lamps are available which will produce high levels of illumination; however, nearly all of them produce the same substantial amounts of infrared radiation. Additionally, most available lamp arrangements generate a substantial amount of heat which tends to build up in the lamp chamber and affect the maintenance of desired temperature levels within the test chamber.

In accordance with one aspect of the subject invention, an arrangement is provided whereby the illumination within the chamber can be produced by the most desirable form of electric lamp available, without particular regard to its heat and/or infrared wavelength output. In particular, in accordance with one aspect, the invention contemplates that the lamps within the light chamber assembly be provided with means for continuously maintaining a flow of cooling air across them to maintain them at a desired operating temperature level and to prevent heat build up within the lamp chamber. Further, the lamps are separated from the test chamber by a thin or relatively narrow barrier of water which is continuously circulated between the lamps and the test chamber proper in a manner to assure that all or substantially all of the light given off by the lamps must pass through the water before entering the test chamber. This arrangement could be accomplished in many ways. For example, the lamp chamber shown in the commonly assigned U.S. Pat. No. 3,393,728, issued July 23, 1968, could be modified by adding a second Plexiglas barrier member between the lamp chamber and the test chamber and continuously circulating water therethrough. This would provide a filtering for the illumination passing from the lamp chamber into the test chamber and, additionally, reduce the amount of cooling air which must pass through the lamp chamber. Clearly, many particular lamp arrangements could be used to provide both an air cooling and water cooling, and filtering.

The preferred form of the lamp assembly is as shown in FIGS. 2 and 3. As shown therein, the lamp preferably includes a first electric lamp member 18 which could be of any desired type, but in the embodiment under consideration, is a tungsten-iodide lamp sold by General Electric Co. under their trade name Quartzline, Catalog No. Q1500.T3/CL. The lamp 18 has its opposite ends mounted in conventional sockets 20 and 22 connected with electric power through the lines 21 and 23. Each of the sockets include a mounting bracket 20' and 22' respectively (see FIG. 2). The sockets are interconnected through rods 24 and 26 which extend between the brackets 20' and 22' and are connected thereto thereto by nuts 28. This arrangement makes the lamp and its sockets a relatively rigid, self-contained assembly.

The lamp 18 is mounted or positioned within a first housing member 30 which comprises a relatively rigid tubular body formed from heat-resistant, light-transmissive material. Preferably, the housing 30 comprises a section of light-transmissive Pyrex glass pipe having an internal diameter sufficiently large to closely but slidably receive the lamp and its mounting brackets.

Means are provided for continuously circulating air through the first housing member 30 to maintain the lamp 18 at a desired operating temperature and to remove heat from the lamp assembly. The air-circulating means could take many forms, but in the subject embodiment, include an adapter member 32 positioned on the left-hand end of member 30 as viewed in FIG. 2. The adapted member 32 is a standard polyvinyl chloride adapter of the type used for interconnecting glass pipe. As shown, the adapter 32 is sealingly engaged with the left-hand end of member 30 by an O-ring 34 positioned in an internal groove formed in the adapter. A blower 36 (shown somewhat schematically) is connected through a mounting plate 40 and a duct section 38 with the inlet end of the adapter 32. Plate 40 is connected to adapter 32 in any convenient manner, such as through the use of screws 42. As can be appreciated, air from blower 36 is continuously passed through the housing 30 and about the lamp 18. As can be seen in FIG. 3, the mounting brackets 20' and 22' do not extend completely across the interior of the member 30 so there is ample space for passage of air therethrough.

Positioned about the first housing member 30, and generally concentric thereto, is a second light-transmissive and heat-resistant housing member 44. Although, as will become apparent hereafter, the housing member 44 could have many configurations, it is preferably a Pyrex glass T-member having its larger-diameter portion arranged concentrically about the member 30 so as to provide an annular cylindrical gap 46 completely about member 30. The T-member 44 is connected to the adapter 32 by a standard split coupling 48 which is provided about its inner surface with annular grooves that sealingly engage outwardly extending lip or flange portions 50 and 52 formed on the adapter 32 and the T-member 44 respectively. A second adapter member 54, which is preferably identical to adapter 32, is connected to the right-hand end of the housing member 30 and sealed thereto by an O-ring seal member 56. A second coupling member 58 having internal annular grooves engages the outwardly extending lips 64 and 66 formed on the adapter 54 and the T-member 44 respectively. This arrangement of the inner housing member 30 and the outer housing or T-member 44 provides a sealed annular chamber completely about the lamp. This allows water to be circulated about the lamp for cooling and filtering.

In the embodiment under consideration, water is supplied to the chamber 46 by a supply pipe 70 which extends axially into the short leg 72 of the T-section 44. As can be seen, the diameter of the pipe 70 is substantially less than the inner diameter of T-section 72. Additionally, pipe 70 terminates closely adjacent member 30 so that water discharged therefrom will impinge against member 30 and tend to flow upwardly about it. The discharge of the water from the chamber is accomplished by a T-member 76 which is connected to the lower end of the portion 72 by a connector 68 of the same type as connectors 48 and 58. The lower end of T-member 76 is sealed about pipe 70 by a polyvinyl chloride adapter 78 and a coupling 80. The water discharging about pipe 70 is conducted through the portion 82 of T-member 76 and connected with a drain line 84 through an adapter 86 and a coupling 88.

As can be appreciated, the described lamp arrangement is extremely simple to construct and can be made from commercially available component and in substantially any size.

Referring again to FIG. 1, the environmental growth chamber shown therein is provided with three lamp assemblies generally similar to that shown in FIGS. 2 and 3. Note that three lamp assemblies 90 are positioned at spaced locations across the top of the light cap assembly 12. Each of the lamp assemblies 90 are identical to the assembly shown in FIGS. 2 and 3 with the exception that the member 44 is a Y-member to permit the main body of the lamp assembly to be entirely within the light cap and the water supply and discharge pipes to extend outside of the lamp chamber housing.

The assembly shown includes a main air supply header 92 which is connected to the lamps through depending pipes 94 connected to the air inlet end of the lamp assemblies. The opposite end of the lamps which extends within the lamp chamber can discharge the air directly into the lamp chamber or, alternately, can be connected through discharge tubes to permit the air to pass through the lamp assembly and out of the lamp chamber. The cooling water is supplied to the lamps by a water supply header 96 which is connected by short riser sections 98 that pass up through the fittings 100 and 102 in the same manner as described with reference to the assembly shown in FIGS. 2 and 3. The discharge of the cooling water from the lamp assembly is conducted through a discharge header 104 to any convenient sink or drain line.

Obviously, many variations in the construction and arrangement of the lamp assemblies could be made without departing from the scope of the invention. For example, a plurality of the lamps could be positioned with one individual housing or, as previously mentioned, the lamp chamber 12 could have its lower end closed by a double-walled barrier and the water circulated between the barrier members with the cooling air passed through the upper portion of the chamber.

The invention has been described in great detail sufficient to enable one of ordinary skill in the art to make and use the same. Modifications and alterations of the preferred embodiment will occur to others upon a reading and understanding of the specification and it is my intention to include all such modifications and alterations as part of my invention insofar as they come within the scope of the appended claims.

Having thus described my invention, I claim:

1. In an environmental growth chamber of the type including a test chamber portion having means for maintaining controlled temperature and humidity conditions therein, and including at least one electric lamp for providing high-intensity illumination in the test chamber portion, the improvement comprising: means for preventing light rays of the infrared portion of the spectrum from being conducted from the lamp chamber to the test chamber and simultaneously conducting away from heat generated by the lamps, said means including: airflow-producing means for passing air across said at least one lamp, first and second lamp housing members formed from light-transmissive material and positioned between said chamber portion and said at least one lamp, said housing members being spaced a short distance apart and providing a barrier for preventing air flowing across said lamp from entering said test chamber, and water supply means for conducting water between said housing members.

2. The improvement as defined in claim 1 wherein said housing members are tubular and positioned about said at least one lamp in generally concentric relationship.

3. The improvement as defined in claim 2 wherein said airflow-producing means is connected with the innermost housing member and conducts air therethrough.

4. The improvement as defined in claim 1 including a plurality of said lamps.

5. The improvement as defined in claim 4 wherein each of said lamps are provided with a set of said housing members.

* * * * *